Feb. 10, 1931. C. W. LEGUILLON 1,792,316
METHOD AND APPARATUS FOR CONVEYING SHRINKING MATERIAL
Filed Sept. 4, 1928 2 Sheets-Sheet 1
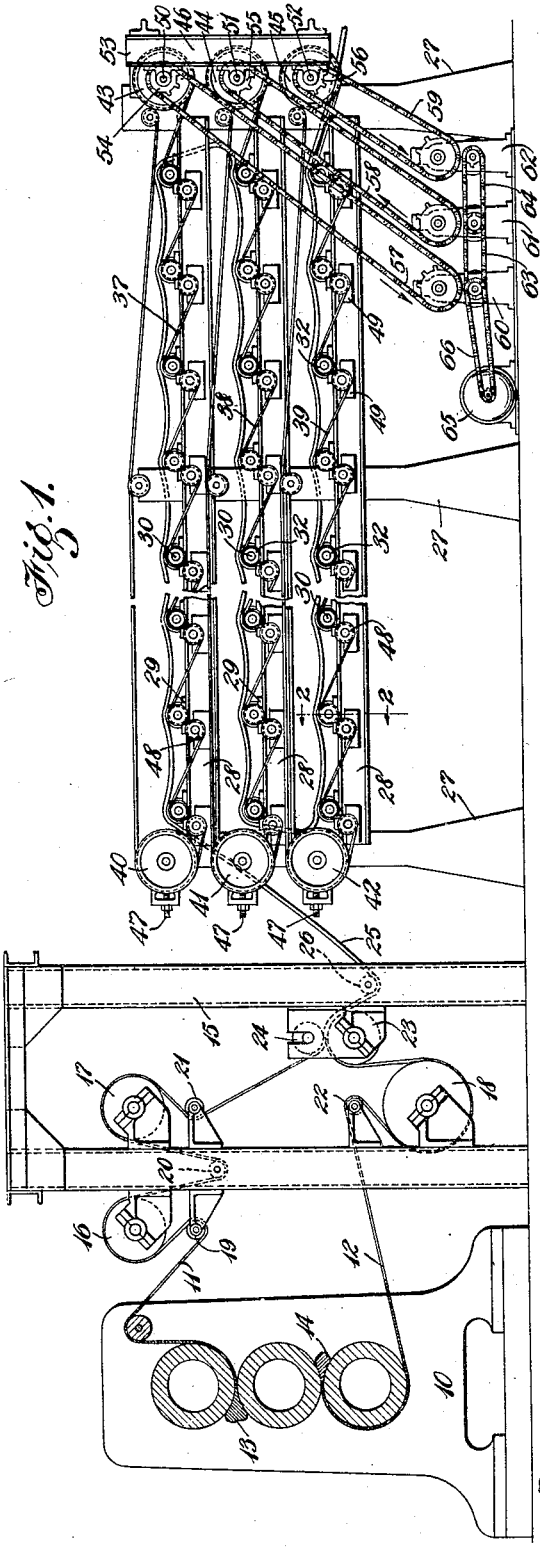
Inventor
Charles W. Leguillon
By Eakin + Avery
Attys.

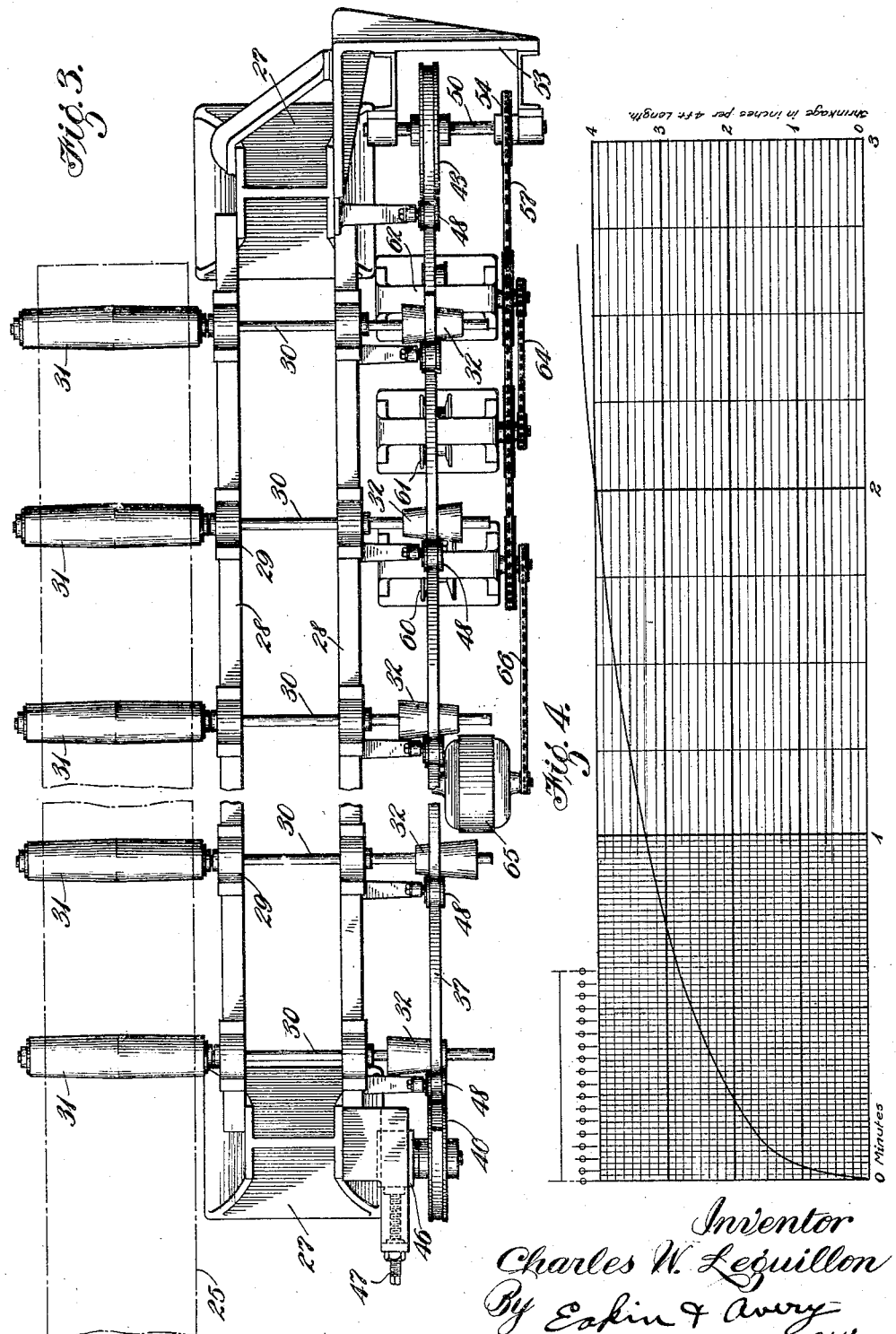

Patented Feb. 10, 1931

1,792,316

UNITED STATES PATENT OFFICE

CHARLES W. LEGUILLON, OF AKRON, OHIO, ASSIGNOR TO THE B. F. GOODRICH COMPANY, OF NEW YORK, N. Y., A CORPORATION OF NEW YORK

METHOD AND APPARATUS FOR CONVEYING SHRINKING MATERIAL

Application filed September 4, 1928. Serial No. 303,942.

This invention relates to the art of handling shrinking material, and especially to procedure and apparatus for feeding a continuous strip of material as the latter shrinks longitudinally.

The invention is of especial value in the manufacture of inner tubes for pneumatic tires from a continuous strip of unvulcanized rubber composition as the latter is delivered in warm, tacky condition from a calender. Heretofore the longitudinal shrinkage of the material has had to be considered in determining the proper initial length of a tube-forming blank cut from the continuous strip, and the rate of shrinkage varied under different conditions which has made uniformity in the length of the blanks difficult to obtain.

I have found that the longitudinal shrinkage of calendered rubber composition is not due entirely to the contraction of cooling, but is largely due to the recoil of the minute globules of rubber in the composition which have been distorted and elongated by the deforming pressure of the calender rolls.

Expedients heretofore adopted for permitting calendered strip material to shrink have been unsatisfactory for several principal reasons. Where the stock is stored in a liner it frequently adheres thereto and also requires the labor of handling and the cost of liners. Where the stock is permitted to shrink upon a conveyor or upon a rigid support, the friction of the stock therewith or the firm anchorage of the end portions of the strip have retarded contraction or caused the contraction to occur chiefly in a direction crosswise of the strip. Feeding the strip through one or more storage loops of considerable length to permit unrestrained contraction has required mechanical means for varying the feed of the strip when the storage loop became too great or too small.

The chief objects of my invention are to provide procedure and apparatus for supporting the strip of stock locally to avoid deforming strains while feeding it longitudinally under conditions such as to permit a desirable amount of shrinkage; to provide for automatically controlling the contraction of the shrinking material; to avoid the necessity of varying the output or the rate of use of the material to compensate for shrinkage; and to provide uniformity of shrinkage in the material.

The rate of shrinkage of the strip material varies, being greatest during the first minute after cooling and progressively less during each succeeding minute, so that by suitably handling the strip material during the first two or three minutes after it has been cooled, I am able to deliver the strip in almost fully contracted condition.

In the preferred form of my invention which is chosen for the purpose of illustration herein the continuous strip material is so handled as to permit the strip to contract in each of a succession of stages until substantially the total normal amount of contraction has been effected, the strip being supported and fed forward at appropriate relative speeds by means engaging the strip at closely-spaced positions so that long depending reaches such as to distort the strip and delay or prevent longitudinal shrinkage are avoided and an even delivery of the shrunken stock is provided.

Although sudden cooling of the stock will not of itself produce an equally sudden contraction of the stock, it is well known that the rate of longitudinal contraction may be accelerated by cooling the stock and subsequently permitting its temperature to rise, and in the preferred practice of my invention I take advantage of this characteristic of rubber to shorten the time required for the strip material to shrink or contract.

Of the accompanying drawings:

Fig. 1 is a side elevation of apparatus embodying and adapted to carry out my invention in its preferred form, and the work therein, a part being broken away.

Fig. 2 is a section on line 2—2 of Fig. 1.

Fig. 3 is a plan view, on a larger scale, of a portion of the apparatus shown in Fig. 1.

Fig. 4 is a graph which illustrates the relative speed of longitudinal contraction in a calendered strip of rubber composition during a three-minute interval.

Referring to the drawings, 10 is a three-roll calender of usual design adapted to calender two sheets or strips of rubber composition 11, 12 from respective banks of stock 13, 14 suitably fed into the bights of the calender rolls. Journaled in a framework 15 at the delivery side of the calender are rotatable cooling drums 16, 17 and 18 which may be driven by any suitable means (not shown), and which may be cooled by ice water circulated through them by means of suitable piping (not shown). The cooling drums 16, 17, are positioned close together and adapted to cool the strip 11, the latter being guided into contact with the drums by guide rollers 19, 20 and 21. In like manner the cooling drum 18 cools the strip 12, a guide roller 22 being provided for directing the strip onto the drum. The drum 18 is larger than the drums 16, 17 so that each strip 11, 12 engages substantially the same area of cooling surface, and the temperature of the drums is such that the strips 11, 12 are cooled below room temperature. The cooling drums are driven at slightly faster surface speed than the rolls of the calender 10 to put the strips 11, 12 under slight tension sufficient to pull the strips from the calender rolls.

Also journaled upon the framework 15 is a drum 23 and a presser roll 24 associated therewith, said drum and roll being adapted to receive the strips 11, 12 from the cooling drums and press them adhesively into face-to-face contact with each other to provide a laminated two-ply strip 25. The drum 23 is driven by suitable mechanism (not shown) at the same surface speed as the cooling drums 16, 17 and 18, and a guide roller 26 is journaled in the framework 15 at the delivery side of the drum 23 to guide the strip 25 delivered therefrom.

Positioned at the delivery side of the framework 15 is my apparatus for locally supporting and feeding the laminated strip material 25 while permitting it to contract longitudinally, the apparatus here shown being adapted to resist the contraction slightly, permissibly to a very small degree, and in so doing to govern the total longitudinal contraction of the strip so that its relative rates of feed in its uncontracted condition and in its final contracted condition can be constant.

The apparatus comprises upright supports 27, 27 connected by horizontal frame members 28, 28, the latter being arranged in pairs on opposite sides of the supports 27, as shown in Figs. 2 and 3. Axially aligned journal brackets 29, 29 are mounted in uniformly spaced relation upon the several pairs of frame members 28, 28 and provide two-point supports of a plurality of shafts 30, 30. At one side of the apparatus the shafts 30 are provided with respective crowned rolls 31, 31, and said rolls provide supports for the strip material 25 and a means for feeding the same longitudinally. As shown, the rolls 31 are arranged in three horizontal rows, one row above the other, to conserve floor space, but they may be disposed in a greater or fewer number of rows as is expedient.

For driving the shafts 30 at differential speeds the ends of the shafts opposite the rolls 31 are provided with respective frusto-conical driving pulleys 32, 32, each pulley being secured to its shaft by means of a feather 33 which has a portion of its outer face notched as at 34 (Fig. 2) and engaged by the conical nose of a spring-pressed detent 35 mounted in a radial bore 36 in the pulley 32. The arrangement is such that the pulley may be quickly and easily adjusted axially upon the shaft 30 for a purpose presently to be described.

For driving the three rows of pulleys 32 I provide respective flat endless driving belts 37, 38, and 39 which are mounted at one end upon respective flanged pulleys 40, 41, and 42 at one end of the apparatus, and upon similar pulleys 43, 44, and 45 at the other end of the apparatus. The pulleys 40, 41, and 42 are journaled upon slide blocks, such as the slide block 46, Fig. 3, said slide blocks being adjustably mounted upon the adjacent support 27 and movable therein by means of screws 47, 47 for keeping the belts 37, 38, and 39 in taut condition. The lower reaches of the belts 37, 38, and 39 pass over the successive pulleys 32 of the three series of pulleys, and guide sheaves 48, 48 journaled upon respective brackets 49, 49 projecting from the frame members 28, are positioned adjacent each pulley 32 for directing the belt 37, 38, or 39 around the same so as to secure sufficient contact therewith to provide the necessary driving friction. The alternate pulleys 32 are mounted in reversed position upon their shafts to equalize the lateral thrust upon the belts 37, 38, and 39 to keep the latter traveling in a straight course. The pulleys 32 being axially adjustable on their shafts may be so positioned thereon as to present different diameters to the driving belts so that differential speed of the shafts 30 and rolls 31 is obtained.

The belt pulleys 43, 44, and 45 are mounted upon respective shafts 50, 51, and 52 journaled in a bracket structure 53 mounted upon a vertical support 27. The shafts 50, 51, and 52 are provided with respective sprockets 54, 55, and 56 connected by sprocket chains 57, 58, and 59 with suitable sprockets upon respective gear-reduction devices 60, 61, and 62. The latter are connected to each other, so as to be driven in unison, by sprocket chains 63, 64, and a motor 65 connected with the device 60 by sprocket chain 66 drives the three gear-reduction devices. The latter are of usual well-known construction and are individually adjustable so that the belts 37, 38, and 39 may be driven at differential speeds. The arrangement by which the belts are driven at differential speeds and the rolls 31 of each series of rolls driven at differential speeds by their respective belts provides a simple method of obtaining the substantial speed differential required between the rolls 31 at the work-receiving end of the apparatus and the rolls at the work-delivery end thereof.

The gear-reduction device 61 is driven in the opposite direction to the devices 60, 62 with the result that the rolls 31 of the middle series of rolls are driven in a reverse direction with relation to the upper and lower series of rolls. The arrangement is such that the strip 25 is propelled upon the upper series of rolls 31 toward the right as viewed in Fig. 1, then toward the left upon the middle series of rolls, and then toward the right upon the lower series of rolls.

In the operation of the apparatus, the strips 11, 12 of unvulcanized rubber composition are sheeted on the calender 10, cooled below room temperature by passing over the cooling drums 16, 17, and 18, and assembled in face-to-face relation between the drum 23 and roll 24 to produce the two-ply laminated strip 25 which is then fed into the adjacent end of the apparatus for feeding the strip longitudinally while controlling its longitudinal contraction, as the strip attains room temperature after its previous cooling. Passing over successive rolls 31 of the several series of rolls, the strip 25 is fed at progressively decreasing speed corresponding substantially to the rate of longitudinal contraction of the strip as indicated by the graph, Fig. 4. Passing from the apparatus at the delivery end thereof, the strip is in condition to be utilized as desired, any further longitudinal contraction being negligible.

Passing from one roll 31 to the succeeding roll 31, the strip 25 in its suspended region is subjected to two opposed forces, namely, the force of gravity acting upon the mass of the strip and tending to elongate the strip because of its own weight, and the contractive force of the shrinking material. The rolls 31 are positioned laterally from each other a sufficient distance that the weight of the strip 25 therebetween is sufficient to exert an appreciable influence on the strip and cause it to sag slightly between successive rolls. The relative rotative speed of the rolls 31 is such as normally to cause each roll to feed forward more material than the next roll toward the delivery end of the series, which compensates for shrinkage occurring between the rolls. The lateral spacing of the rolls 31 and their relative differential speeds are so coordinated with the plasticity of the strip material and its rate and ratio of contraction that the longitudinal contraction of the strip between successive rolls compensates for the relatively great yardage of the strip fed forward by the preceding roll, but is held to a value slightly less than the normal shrinkage by the tension of the strip incident to its being suspended between the rolls. Accumulation of a long loop of stock between the rolls is prevented by reason of the fact that, with the speeds controlled within suitable limits and with the suspended reach initially short, lengthening of the suspended reach results in a reduction of its tension, in accordance with the principles of a funicular or a catenary, and a consequent increase of shrinkage, as contrasted with a long depending loop, in which tension increases with increase of the length of the loop, so that, in my device, a condition of substantial equilibrium is reached, as to the length of the suspended reach, and the relative speeds of the rolls consequently control the amount of shrinkage occurring in the strip between them.

The apparatus, when once suitably adjusted, is fully automatic in operation and delivers the strip material in uniformly contracted condition.

My invention is susceptible of modification within the scope of the appended claims.

I claim:

1. The method of shrinking a warm strip of unvulcanized rubber composition which comprises effecting a reduction and then a rise in the temperature of the strip and during the rise of temperature conveying the strip longitudinally at progressively decreasing speed.

2. The method of conveying longitudinally-shrinking material which comprises feeding the material into a suspended reach and determinately limiting the shrinkage of the material in the said reach.

3. A method as defined in claim 2 in which the initial length of the reach of material, the distance between its points of support and the rates of in-feed and out-feed are so coordinated that shortening of the reach results in increased tension therein and lengthening of the reach results in decreased tension therein.

4. A method as defined in claim 2 in which the material is fed in a succession of suspended reaches at progressively decreasing speed.

5. The method which comprises progressively feeding a strip of longitudinally-shrinking material into and out of a suspended reach, the in-feed being greater than the out-feed, and the difference being less than the normal shrinkage of the material while in the said reach.

6. Apparatus for conveying a continuous strip of longitudinally-shrinking material, said apparatus comprising strip-supporting rolls, and means for driving said rolls at differential speeds to feed the strip into and out of a reach suspended between the rolls, the in-feed being greater than the out-feed and their difference being less than the normal shrinkage of the material while in the said reach.

7. Apparatus as defined in claim 6 comprising a series of the rolls adapted to support a plurality of the suspended reaches in series and to feed the strip through them at progressively decreasing speed.

8. Apparatus for conveying a continuous strip of longitudinally-shrinking material, said apparatus comprising strip-supporting rolls, and means for driving said rolls at differential speeds to feed the strip through a reach suspended between them, the spacing of the rolls, their relative speeds and the initial length of the reach suspended between them being so coordinated with the strip's normal rate of shrinkage that shortening of the reach results in increased tension therein and lengthening of the reach results in decreased tension therein.

9. Strip-feeding apparatus comprising a series of strip-supporting and feeding rolls, means common to said rolls for concurrently driving them, and means for varying the speeds at which the individual rolls are driven by the said driving means.

10. Strip-feeding apparatus as defined in claim 8 in which the speed-varying means comprises conical members axially adjustable on the roll shafts to alter their point of contact with a common driving means.

11. Strip-feeding apparatus comprising a plurality of series of strip-supporting and feeding rolls, means individual to each series for driving the rolls thereof, means for driving the said individual series-driving means at differential speeds, and means for varying the relative speeds at which the individual rolls of each series are driven by the series-driving means.

In witness whereof I have hereunto set my hand this 23rd day of August, 1928.

CHARLES W. LEGUILLON.